(12) United States Patent
Murashige et al.

(10) Patent No.: US 11,639,046 B2
(45) Date of Patent: May 2, 2023

(54) GLASS FILM-RESIN COMPOSITE

(71) Applicant: NITTO DENKO CORPORATION, Ibaraki (JP)

(72) Inventors: Takeshi Murashige, Ibaraki (JP); Junichi Inagaki, Ibaraki (JP); Atsushi Kishi, Ibaraki (JP); Kota Nakai, Ibaraki (JP); Toshihiro Kanno, Ibaraki (JP)

(73) Assignee: NITTO DENKO CORPORATION, Ibaraki (JP)

(*) Notice: Subject to any disclaimer, the term of this patent is extended or adjusted under 35 U.S.C. 154(b) by 0 days.

(21) Appl. No.: 17/045,821

(22) PCT Filed: Apr. 17, 2019

(86) PCT No.: PCT/JP2019/016472
§ 371 (c)(1),
(2) Date: Oct. 7, 2020

(87) PCT Pub. No.: WO2019/208360
PCT Pub. Date: Oct. 31, 2019

(65) Prior Publication Data
US 2021/0138764 A1      May 13, 2021

(30) Foreign Application Priority Data
Apr. 25, 2018   (JP) .............................. JP2018-084412

(51) Int. Cl.
*B32B 17/10*   (2006.01)
*B32B 27/36*   (2006.01)
(Continued)

(52) U.S. Cl.
CPC .................. *B32B 7/12* (2013.01); *B32B 3/08* (2013.01); *B32B 17/10* (2013.01); *B32B 27/36* (2013.01);
(Continued)

(58) Field of Classification Search
CPC ....................................................... B32B 7/12
See application file for complete search history.

(56) References Cited

U.S. PATENT DOCUMENTS 4,749,739 A * 6/1988 Foster .................... C09J 123/16
                                                     524/274
8,525,405 B2   9/2013 Kuwabara et al.
(Continued)

FOREIGN PATENT DOCUMENTS

CN      104220253 A    12/2014
JP       55-91843 U     6/1980
(Continued)

OTHER PUBLICATIONS

JP-2015174694-A machine translation (Year: 2015).*
(Continued)

*Primary Examiner* — Ian A Rummel
(74) *Attorney, Agent, or Firm* — WHDA, LLP (57) ABSTRACT

Provided is a glass film-resin composite, which prevents the breakage of a glass film and enables the production of an elongated glass film. The glass film-resin composite of the present invention includes: an elongated glass film; and a resin tape arranged on at least one surface of the elongated glass film, wherein the resin tape is linearly arranged at least near each of both ends in a widthwise direction of the elongated glass film in one surface of the elongated glass film, and wherein the resin tape includes an adhesive layer, and the adhesive layer is directly arranged on the elongated glass film.

6 Claims, 2 Drawing Sheets

(51) Int. Cl.
  *B32B 7/12*    (2006.01)
  *B32B 3/08*    (2006.01)
  *C09J 7/38*    (2018.01)
  *C09J 7/25*    (2018.01)

(52) U.S. Cl.
  CPC ............... *C09J 7/255* (2018.01); *C09J 7/385* (2018.01); *C09J 2423/00* (2013.01); *C09J 2433/00* (2013.01); *C09J 2463/00* (2013.01)

(56) References Cited

U.S. PATENT DOCUMENTS

| | | | |
|---|---|---|---|
| 9,017,759 | B2 | 4/2015 | Garner et al. |
| 9,604,808 | B2 | 3/2017 | Garner et al. |
| 10,183,826 | B2 | 1/2019 | Garner et al. |
| 11,241,863 | B2 | 2/2022 | Murashige et al. |
| 2011/0023548 | A1 | 2/2011 | Garner et al. |
| 2012/0258315 | A1* | 10/2012 | Foulc .................. C08J 5/08 428/416 |
| 2012/0258584 | A1 | 10/2012 | Garner et al. |
| 2015/0072125 | A1 | 3/2015 | Murashige et al. |
| 2015/0165749 | A1 | 6/2015 | Tamagaki |
| 2015/0176118 | A1 | 6/2015 | Tamagaki et al. |
| 2015/0197407 | A1 | 7/2015 | Garner et al. |
| 2017/0057770 | A1 | 3/2017 | Garner et al. |
| 2017/0232701 | A1 | 8/2017 | Keite-Telgenbuscher et al. |
| 2019/0270663 | A1 | 9/2019 | Murashige et al. |
| 2019/0322079 | A1 | 10/2019 | Murashige et al. |
| 2020/0198302 | A1 | 6/2020 | Murashige et al. |
| 2022/0118739 | A1 | 4/2022 | Murashige et al. |

FOREIGN PATENT DOCUMENTS

| | | | |
|---|---|---|---|
| JP | 2012-224058 | A | 11/2012 |
| JP | 2013-500923 | A | 1/2013 |
| JP | 2013-212633 | A | 10/2013 |
| JP | 2014-51429 | A | 3/2014 |
| JP | 2015-174694 | A | 10/2015 |
| JP | 2015174694 | A * | 10/2015 |
| JP | 2017-109447 | A | 6/2017 |
| TW | 201345731 | A | 11/2013 |
| TW | 201410565 | A | 3/2014 |
| TW | 201623183 | A | 7/2016 |
| WO | 2018/079545 | A1 | 5/2018 |
| WO | 2018/079546 | A1 | 5/2018 |

OTHER PUBLICATIONS

Office Action dated Jan. 13, 2021, issued in counterpart of Taiwan Patent Application No. 108114304 with English Translation. (9 pages).
International Search Report dated Jul. 9, 2019, issued in counterpart International Application No. PCT/JP2019/016472 (2 pages).
Extended (Supplementary) European Search Report dated Nov. 29, 2021, issued in counterpart EP application No. 19794039.8. (6 pages).
Office Action dated Jun. 29, 2022, issued in counterpart CN application No. 201980027811.1, with English translation. (12 pages).
Office Action dated Dec. 20, 2022, issued in counterpart TW application No. 108114304, with English translation. (14 pages).
Office Action dated Nov. 8, 2022, issued in counterpart to JP application No. 2020-516269 with English machine translation. (10 pages).

* cited by examiner

GLASS FILM-RESIN COMPOSITE

TECHNICAL FIELD

The present invention relates to a glass film-resin composite.

BACKGROUND ART

In recent years, the weight reductions and thinning of display and lighting elements each using a liquid crystal display element or an organic EL, and of a solar cell have been advancing from the viewpoints of conveyability, storability, and a design property, and development toward continuous production by a roll-to-roll process has also been advancing. The use of extremely thin glass (hereinafter also referred to as "glass film") has been proposed as a method of imparting flexibility to glass to be used in those elements and the like. The glass film has flexibility and can be wound in a roll shape, and hence can be processed by the roll-to-roll process. There has heretofore been a disclosure of, for example, a method including processing a polarizing plate, a transparent electrode, or the like on the glass film through use of the roll-to-roll process (e.g., Patent Literature 1).

A glass material originally involves a problem in that its handleability is poor owing to its brittleness, and the problem with handleability becomes remarkable in the glass film that is so thin as to be windable in a roll shape. In particular, the glass film involves a problem in that it is difficult to continuously produce and process the glass film without its breakage, though the glass film has an advantage in that the glass film can be processed by the roll-to-roll process.

CITATION LIST

Patent Literature

[PTL 1] U.S. Pat. No. 8,525,405 B2

SUMMARY OF INVENTION

Technical Problem

The present invention has been made to solve the conventional problems, and an object of the present invention is to provide a glass film-resin composite, which prevents the breakage of a glass film and enables the production of an elongated glass film.

Solution to Problem

According to one embodiment of the present invention, there is provided a glass film-resin composite, including: an elongated glass film; and a resin tape arranged on at least one surface of the elongated glass film, wherein the resin tape is linearly arranged at least near each of both ends in a widthwise direction of the elongated glass film in one surface of the elongated glass film, and wherein the resin tape includes an adhesive layer, and the adhesive layer is directly arranged on the elongated glass film.

In one embodiment, the four or more resin tapes are arranged per one surface of the elongated glass film.

In one embodiment, the resin tape is arranged on each of both surfaces of the elongated glass film.

In one embodiment, the resin tape arranged on a front surface of the elongated glass film and the resin tape arranged on a rear surface of the elongated glass film are arranged so as to be free from being opposite to each other.

In one embodiment, the glass film-resin composite further includes a slip sheet arranged on one surface of the elongated glass film.

In one embodiment, the resin tape includes a base material and the adhesive layer arranged on one side of the base material, a width Lt (mm) of the resin tape, a Young's modulus Eg (GPa) of the elongated glass film, a Young's modulus Es (GPa) of the base material, a thickness Tg (μm) of the elongated glass film, and a thickness Ts (μm) of the base material have a relationship represented by the following equation (1), and α in the following equation (1) represents 1.1 or more.

$$Lt = \alpha \frac{Eg\sqrt{Tg}}{EsTs} \quad (1)$$

In one embodiment, the glass film-resin composite has a roll shape.

In one embodiment, the adhesive layer has a Young's modulus of 1 GPa or more.

Advantageous Effect of Invention

According to the present invention, the glass film-resin composite, which prevents the breakage of a glass film and enables the production of an elongated glass film, can be provided.

DESCRIPTION OF EMBODIMENTS

A. Overall Configuration of Glass Film-Resin Composite

Figures 1A, 1B:
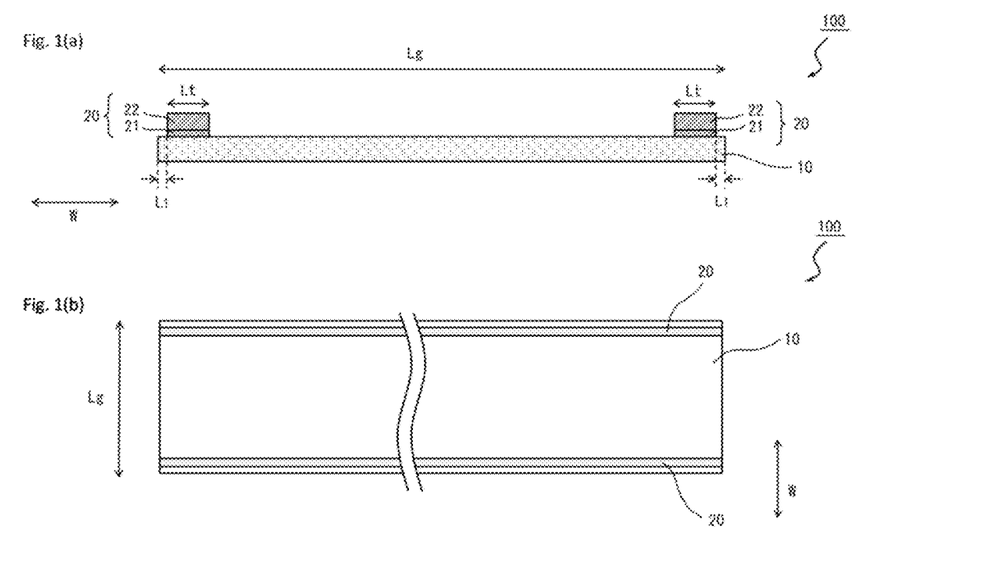
FIG. 1(a) is a schematic sectional view of a glass film-resin composite according to one embodiment of the present invention.
FIG. 1(b) is a schematic plan view of the glass film-resin composite according to the one embodiment of the present invention.

FIG. 1(a) is a schematic sectional view of glass film-resin composite according to one embodiment of the present invention, and FIG. 1(b) is a schematic plan view of the glass film-resin composite according to the one embodiment of the present invention. A glass film-resin composite 100 includes an elongated glass film 10 and a resin tape 20 arranged on at least one surface (one surface in each of FIG. 1(a) and FIG. 1(b)) of the elongated glass film 10. The resin tape 20 is linearly arranged at least near each of both ends in the widthwise direction (a direction W in each of FIG. 1(a) and FIG. 1(b)) of the elongated glass film 10 in one surface of the elongated glass film 10.

The resin tape 20 includes an adhesive layer 21, and further includes a base material 22 as required (details are described later). The adhesive layer 21 is directly arranged (fixed) on the elongated glass film 10 (i.e., arranged (fixed) without any other layer being interposed). In the present invention, the elongated glass film (sometimes simply referred to as "glass film") is protected with the resin tape including the adhesive layer. Accordingly, the resin tape suppresses the propagation of failure starting from a crack occurring in an end portion in the widthwise direction of the glass film, and hence can prevent the failure of the glass film. The glass film-resin composite of the present invention hardly causes an inconvenience such as rupture even when bent, and hence the use of the glass film-resin composite enables continuous production and processing of a glass film. In this description, the term "adhesive layer" means a layer formed of an adhesive, and the term "adhesive" refers to an adhesive that exhibits its peel-resisting force by being solidified. The "adhesive layer" is clearly distinguished from a pressure-sensitive adhesive layer including a pressure-sensitive adhesive that exhibits its peel-resisting force without being solidified. In one embodiment, the glass film-resin composite is formed so that when an attempt is made to peel the resin tape from the elongated glass film, no interfacial failure may occur at an interface between the resin tape and the elongated glass film.

The term "elongated" as used herein means a slender shape whose length is sufficiently long as compared to its width, and includes, for example, a slender shape having a length 10 or more times, preferably 20 or more times as long as its width. The length of the glass film-resin composite of the present invention is preferably 50 m or more, more preferably 100 m or more, still more preferably 500 m or more. According to the present invention, the breakage of a glass film can be effectively prevented, and hence a glass film having such a length that it has heretofore been impossible to continuously produce and process the glass film (e.g., 500 m or more) can be handled. The upper limit of the length of the glass film is not particularly limited, and is, for example, 1,000 m.

The width of the glass film-resin composite of the present invention is preferably from 100 mm to 5,000 mm, more preferably from 200 mm to 3,000 mm, still more preferably from 500 mm to 2,000 mm.

In one embodiment, the glass film-resin composite of the present invention is provided in a roll shape.

In one embodiment, the glass film in the glass film-resin composite of the present invention is used after a portion where the resin tape is arranged and the outside of the portion have been removed. For example, a laminate including the glass film may be produced by: laminating another layer (e.g., an optical film, such as a polarizing plate, a highly heat-resistant film, such as transparent polyimide, or a light modulation film, such as a PDLC) on the glass film-resin composite to form a laminate having a predetermined strength; and then removing the portion where the resin tape is arranged and the outside of the portion in accordance with a method such as slitting. The region of the glass film to be finally used without being removed is hereinafter sometimes referred to as "effective region of the glass film." In other words, the glass film includes: the effective region planned to be put into practical use later, the resin having no resin tape arranged thereon; and a region planned to be removed together with the resin tape.

Figure 2:
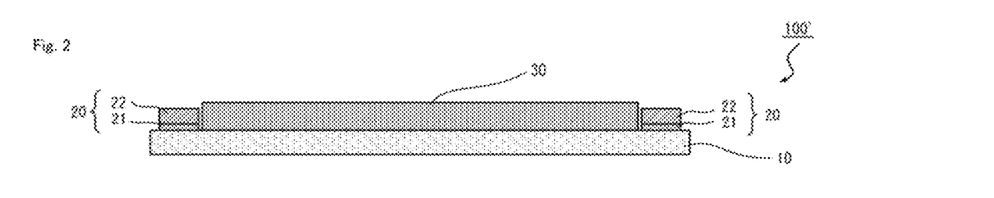
FIG. 2 is a schematic sectional view of a glass film-resin composite according to another embodiment of the present invention.

FIG. 2 is a schematic sectional view of a glass film-resin composite according to another embodiment of the present invention. A glass film-resin composite 100' further includes a slip sheet 30 arranged on one surface of the glass film 10. In one embodiment, the slip sheet 30 has an elongated shape, and is arranged so as to cover the effective region of the glass film. When the glass film-resin composite including the slip sheet is wound in a roll shape, the front surface and rear surface of the glass film may be laminated so as to be opposite to each other through the slip sheet. When the composite includes the slip sheet 30, a glass film-resin composite excellent in handleability can be obtained. In addition, a glass film-resin composite, which hardly causes blocking when turned into a roll shape, can be obtained.

B. Resin Tape

B-1. Arrangement of Resin Tape

As described above, the resin tape 20 is linearly arranged at least near each of both the ends in the widthwise direction of the elongated glass film 10 in one surface. That is, the at least two resin tapes 20 are arranged on at least one surface of the elongated glass film 10. The resin tape 20 preferably has a continuous linear shape. The length of the resin tape 20 is preferably 80% or more, more preferably 90% or more, most preferably 100% with respect to the length of the elongated glass film 10. That is, the resin tape 20 is most preferably arranged over the entire length of the elongated glass film 10.

The width Lt of each of the resin tapes 20 is preferably from 3 mm to 100 mm, more preferably from 5 mm to 60 mm, still more preferably from 10 mm to 50 mm. When the width falls within such ranges, the progress of a crack occurring in the glass film can be more effectively suppressed.

The width Lt of each of the resin tapes 20 and the width Lg of the elongated glass film preferably have a relationship of $10 \leq Lg/Lt \leq 200$, and more preferably have a relationship of $15 \leq Lg/Lt \leq 100$. When the widths have such relationships, the progress of a crack occurring in the glass film can be more effectively suppressed.

The total length of the widths Lt of the resin tapes 20 in one surface is preferably less than 50%, more preferably 40% or less, still more preferably 30% or less, particularly preferably 20% or less with respect to the width Lg of the elongated glass film. The lower limit of the total length of the widths Lt of the resin tapes 20 is preferably 5% or more, more preferably 10% or more with respect to the width Lg of the elongated glass film. The term "total length of the widths Lt of the resin tapes" means a length obtained by totalizing the widths Lt of the resin tapes arranged in plurality. In addition, when the resin tapes are arranged on both surfaces of the glass film as described later, the term "total length of the widths Lt of the resin tapes in one surface" means the total length of the widths Lt of the resin tapes in each of the surfaces.

The lower limit of the thickness of the resin tape 20 is preferably 1 μm or more, more preferably 10 μm or more, still more preferably 30 μm or more. The upper limit of the thickness of the resin tape 20 is preferably 200 μm or less, more preferably 150 μm or less, still more preferably 100 μm or less. When the resin tape includes the base material and the adhesive layer as described later, the term "thickness of the resin tape" means the total thickness of the base material and the adhesive layer, and when the resin tape includes only the adhesive layer, the term means the thickness of the adhesive layer.

The widths of the resin tapes arranged in plurality may be identical to or different from each other. The lengths of the resin tapes arranged in plurality may be identical to or different from each other. The thicknesses of the resin tapes arranged in plurality may be identical to or different from each other.

An interval $L_1$ (shortest interval) between the resin tape arranged near each of both the ends in the widthwise direction of the elongated glass film and the end portion of the glass film is preferably 50 mm or less, more preferably 20 mm or less, still more preferably 10 mm or less, particularly preferably from 0 mm to 5 mm.

The interval $L_1$ between the resin tape arranged near each of both the ends in the widthwise direction of the elongated glass film and the end portion of the glass film, and the width Lg of the elongated glass film preferably have a relationship of $10 \leq Lg/L_1 \leq 1,500$, and more preferably have a relationship of $30 \leq Lg/L_1 \leq 500$.

An interval $L_2$ between the resin tapes arranged near both the ends in the widthwise direction of the elongated glass film is preferably from 50% to 95%, more preferably from 70% to 90% with respect to the width Lg of the elongated glass film. When the interval falls within such ranges, the progress of a crack occurring in the glass film can be more effectively suppressed. Such effect becomes particularly significant when the ratio $Lg/L_1$ falls within the above-mentioned ranges.

Figure 3:
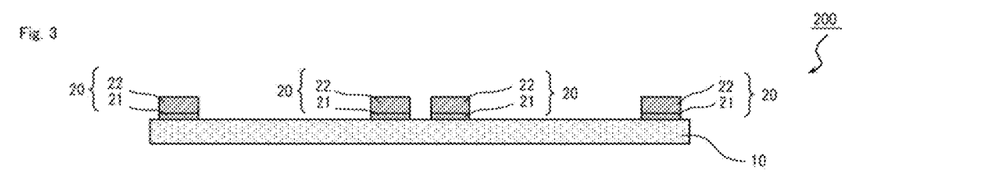
FIG. 3 is a schematic sectional view of a glass film-resin composite according to another embodiment of the present invention.

FIG. 3 is a schematic sectional view of a glass film-resin composite according to one embodiment of the present invention. A glass film-resin composite 200 of FIG. 3 includes the more than two (four in the illustrated example) resin tapes 20 on one surface of the elongated glass film 10. When the glass film-resin composite of such form is divided in two in its widthwise direction, an elongated glass film including the resin tapes near both ends in its widthwise direction can be obtained.

The number of the resin tapes is preferably even. When the number of the resin tapes is even, a plurality of elongated glass films each including the resin tapes near both ends in its widthwise direction can be obtained. In one embodiment, the four or more resin tapes are arranged per one surface of the elongated glass film.

In one embodiment, the resin tape is arranged on a surface that is on the outside (convex side) when the glass film-resin composite is bent. The progress of a crack remarkably occurs in a surface to which a tensile stress is applied. Accordingly, when the resin tape is arranged on the surface that is on the outside (convex side) when the composite is bent, the progress of the crack can be effectively prevented. In this embodiment, the resin tape is arranged, for example, as follows: when the glass film-resin composite is wound in a roll shape, the tape is arranged on a surface that is on the outside of the roll.

Figure 4:
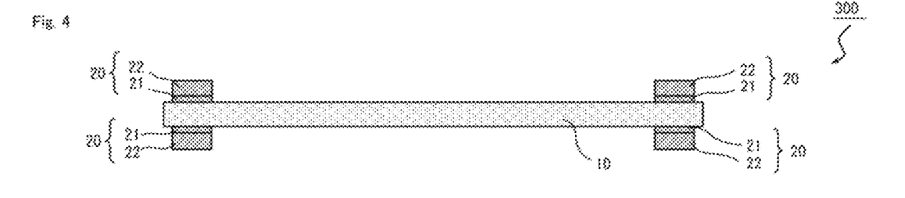
FIG. 4 is a schematic sectional view of a glass film-resin composite according to another embodiment of the present invention.

FIG. 4 is a schematic sectional view of a glass film-resin composite according to one embodiment of the present invention. A glass film-resin composite 300 of FIG. 4 includes the resin tapes 20 on both surfaces of the elongated glass film 10. In this embodiment, the two or more resin tapes 20 may be arranged on one surface (front surface), and the two or more resin tapes 20 may be arranged on the other surface (rear surface). The number of the resin tapes 20 arranged on the one surface and the number of the resin tapes 20 arranged on the other surface are preferably identical to each other.

When the resin tapes are arranged on both the surfaces of the glass film, the progress of a crack can be effectively prevented irrespective of the direction in which the glass film-resin composite is bent. The glass film-resin composite having the configuration is particularly useful when subjected to a production-processing line including a plurality of conveying rolls, and can prevent the breakage of the glass film irrespective of which one of front and rear directions the composite is bent in.

Figure 5:
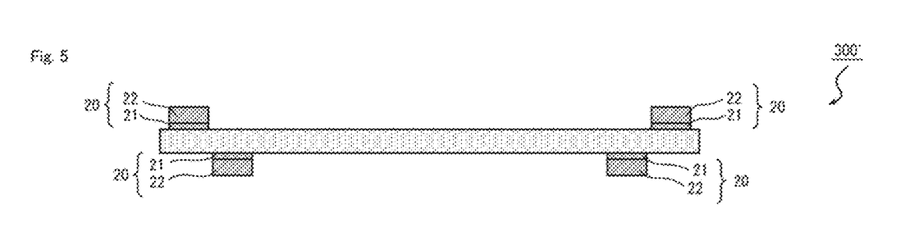
FIG. 5 is a schematic sectional view of a glass film-resin composite according to another embodiment of the present invention.

In one embodiment, as illustrated in FIG. 4, the resin tapes arranged on the front surface and the resin tapes arranged on the rear surface are opposite to each other through the glass film. In another embodiment, as illustrated in FIG. 5, the resin tapes arranged on the front surface and the resin tapes arranged on the rear surface are arranged so as not to be opposite to each other. When the resin tapes present on the front and rear surfaces are arranged so as not to be opposite to each other, that is, so as to shift from each other, an inconvenience at the time of the winding of the glass film-resin composite can be prevented. In addition, when the slip sheet is used, its usage amount can be reduced.

The embodiments illustrated in FIG. 1(a) to FIG. 5 may be appropriately combined.

B-2. Configuration of Resin Tape

In one embodiment, the resin tape includes the base material 22 and the adhesive layer 21 arranged on one surface of the base material as illustrated in each of FIG. 1(a) and FIG. 1(b). In another embodiment, the resin tape includes only the adhesive layer.

The base material may include any appropriate material. In one embodiment, the base material includes any appropriate resin material. Examples of the resin for forming the base material include polyethylene, polyvinyl chloride, polyethylene terephthalate, polyvinylidene chloride, polypropylene, polyvinyl alcohol, polyester, polycarbonate, polystyrene, polyacrylonitrile, an ethylene-vinyl acetate copolymer, an ethylene-vinyl alcohol copolymer, an ethylene-methacrylic acid copolymer, a polyamide-based resin, cellulose, and a silicone-based resin.

The base material may include a primer layer. A material that may improve adhesiveness with the adhesive layer is used as a material for forming the primer layer. Examples of the material for the primer layer include a polyester-based resin, a polycarbonate-based resin, an epoxy-based resin, an alkyd-based resin, an acrylic resin, a urea-based resin, and a urethane-based resin. In particular, when a base material formed of a polyester-based resin is used, a layer containing a resin selected from a polyester-based resin, an acrylic resin, and a urethane-based resin is preferably used as the primer layer from the viewpoint of an adhesive property. In addition, the base material may be subjected to a surface modification treatment, such as a corona treatment or a plasma treatment, for improving the adhesiveness with the adhesive layer.

The thickness of the base material preferably from 2 µm to 200 µm, more preferably from 10 µm to 150 µm, still more preferably from 20 µm to 100 µm.

It is preferred that the width of the base material be substantially identical to the width of the adhesive layer. The phrase "widths are substantially identical to each other" means that a difference between the widths is 3 mm or less (preferably 1 mm or less).

In one embodiment, a width Lt (mm) of each of the resin tapes, a Young's modulus Eg (GPa) of the glass film, a Young's modulus Es (GPa) of the base material, a thickness Tg (µm) of the glass film, and a thickness Ts (µm) of the base material have a relationship represented by the following equation (1), and $\alpha$ represents a reinforcement coefficient (mm·(µm)$^{1/2}$), and represents 1.1 or more. The use of a resin tape having a width represented by the following equation (1) can provide a glass film-resin composite that can more effectively suppress the progress of a crack occurring in its glass film.

$$Lt = \alpha \frac{Eq\sqrt{Tg}}{EsTs} \quad (1)$$

In this description, the Young's modulus Eg of the glass film is measured by a resonance method (JIS R 1602, measurement temperature: 25° C.). In addition, the Young's modulus Es of the base material may be measured with an autograph under the following conditions.
<Method of Measuring Young's Modulus of Base Material>
Measurement temperature: 25° C.
Sample size: A thickness of 50 μm, a width of 2 cm, and a length of 15 cm
Chuck-to-chuck distance: 10 cm
Tensile rate: 10 mm/min The reinforcement coefficient α (mm·(μm)$^{1/2}$) is preferably 1.3 or more, more preferably from 1.3 to 50.

The adhesive layer contains any appropriate adhesive. In one embodiment, a photocurable or thermosetting adhesive may be used. Examples of the adhesive for forming the adhesive layer include an epoxy-based adhesive, a rubber-based adhesive, an acrylic adhesive, a silicone-based adhesive, a urethane-based adhesive, and a mixture thereof.

The Young's modulus of the adhesive layer is preferably 1 GPa or more, more preferably from 2 GPa to 10 GPa. The Young's modulus of the adhesive layer may be measured with an autograph under the following conditions.
<Method of Measuring Young's Modulus of Adhesive Layer>
Measurement temperature: 25° C.
Sample size: A thickness of 50 μm, a width of 2 cm, and a length of 15 cm
Chuck-to-chuck distance: 10 cm
Tensile rate: 10 mm/min The thickness of the adhesive layer is preferably from 1 μm to 50 μm, more preferably from 5 μm to 30 μm.

C. Glass Film

Any appropriate glass film may be adopted as the glass film. According to classification based on composition, examples of the glass film include soda-lime glass, borate glass, aluminosilicate glass, and quartz glass films. In addition, according to classification based on an alkali component, examples of the glass film include alkali-free glass and low-alkali glass films. The content of an alkali metal component (e.g., $Na_2O$, $K_2O$, or $Li_2O$) in the glass is preferably 15 wt % or less, more preferably 10 wt % or less.

The thickness of the effective region of the glass film is preferably from 30 μm to 150 μm, more preferably from 50 μm to 140 μm, still more preferably from 70 μm to 130 μm, particularly preferably from 80 μm to 120 μm.

The width Lg of the glass film is not particularly limited, but is preferably from 100 mm to 5,000 mm, more preferably from 200 mm to 3,000 mm, still more preferably from 500 mm to 2,000 mm.

The glass film preferably has a light transmittance at a wavelength of 550 nm of 85% or more. The glass film preferably has a refractive index at a wavelength of 550 nm of from 1.4 to 1.65.

The glass film has a density of preferably from 2.3 g/cm$^3$ to 3.0 g/cm$^3$, more preferably from 2.3 g/cm$^3$ to 2.7 g/cm$^3$.

Any appropriate method may be adopted as a forming method for the glass film. The glass film is typically produced by melting a mixture containing a main raw material, such as silica or alumina, a fining agent, such as salt cake or antimony oxide, and a reducing agent, such as carbon, at a temperature of from 1,400° C. to 1,600° C., and forming the molten mixture into a thin sheet shape, followed by cooling. Examples of the forming method for the glass film include a slot down-draw method, a fusion method, and a float method. The glass film formed in a sheet shape by any one of those methods may be chemically polished with a solvent, such as hydrofluoric acid, as required, in order to reduce its thickness or enhance its smoothness.

D. Slip Sheet

Examples of a material for forming the slip sheet include: resin sheets of polyethylene terephthalate, polystyrene, polyethylene, polypropylene, polyimide, nylon, polyvinyl chloride, polyester, polycarbonate, cellophane, and silicone; formable resin sheets; and paper.

In one embodiment, the slip sheet is laminated only on the effective region of the glass film. With such configuration, a glass film-resin composite, which can form a satisfactory roll without a winding shift, can be obtained.

The thickness of the slip sheet is preferably larger than the thickness of the resin tape. With such configuration, a glass film-resin composite, which can form a satisfactory roll without an inconvenience such as a winding shift, can be obtained.

E. Method of Producing Glass Film-Resin Composite

The glass film-resin composite may be produced through the fixing of the resin tape on the glass film by any appropriate method. Examples of the method of fixing the resin tape include: (i) a method including applying the adhesive onto the glass film and curing the adhesive; and (ii) a method including applying the adhesive onto the glass film and/or the base material laminating the glass film and the base material via the adhesive, and then curing the adhesive. According to the method (i), a glass film-resin composite including a resin tape free of any base material can be obtained. According to the method (ii), a glass film-resin composite including a resin tape including the base material and the adhesive layer can be obtained. It is preferred that the application of the adhesive and the supply of the base material, and the curing of the adhesive be continuously performed while the elongated glass film is conveyed. In one embodiment, the application of the adhesive and the supply of the base material are performed while the glass film is conveyed as it is without being wound after the glass film has been produced. At this time, the glass film to be used for fixing the resin tape may be a glass film with ear portions. The term "glass film with ear portions" means a glass film having thick-wall portions (ear portions) produced in end portions in the widthwise direction of the glass film, the ear portions being produced when both the ends in the widthwise direction of the glass film are mechanically held at the time of its forming. The resin tape may be arranged inside each of the ear portions.

Examples of a method of applying the adhesive include: coating methods, such as air doctor coating, blade coating, knife coating, reverse coating, transfer roll coating, gravure roll coating, kiss coating, cast coating, spray coating, slot orifice coating, calender coating, electrodeposition coating, dip coating, and die coating; and printing methods including a letterpress printing method, such as flexographic printing, an intaglio printing method, such as a direct gravure printing method or an offset gravure printing method, a lithographic printing method, such as an offset printing method, and a stencil printing method, such as a screen printing method.

Any appropriate method may be adopted as a method of curing the adhesive in accordance with the kind of the adhesive. In one embodiment, the adhesive may be cured by UV irradiation or a heating treatment. A condition for the UV irradiation is, for example, as follows: an irradiation integrated light quantity is from 100 mJ/cm$^2$ to 2,000 mJ/cm$^2$, preferably from 200 mJ/cm$^2$ to 1,000 mJ/cm$^2$.

When the resin tape is fixed to the glass film with ear portions, the ear portions are preferably removed by slitting after the lamination of the resin tape. The ear portions are preferably removed after the lamination of the resin tape and before the winding of the glass film-resin composite. An approach to removing the ear portions is, for example, a method including mechanically cutting the glass film, a method including arranging a flaw (scribe) in the surface of the glass film and growing a crack (breaking the glass film) with heat or a bending stress, or a method including dividing the glass film through irradiation with laser light. A laser light source is, for example, a $CO_2$ laser or an YAG laser.

The glass film-resin composite obtained after the lamination of the resin tape (and after the slitting of the ear portions as required) may be wound in a roll shape. In one embodiment, the roll of the glass film-resin composite including the slip sheet is formed by performing a winding step while supplying the slip sheet so that the slip sheet may be laminated on one surface of the glass film.

EXAMPLES

The present invention is specifically described below by way of Examples, but the present invention is by no means limited to these Examples.

Production Example 1

(Preparation of Adhesive)
An epoxy-based resin (manufactured by Daicel Chemical Industries, Ltd., product name: "CELLOXIDE 2021P"), another epoxy-based resin (manufactured by Daicel Chemical Industries, Ltd., product name: "EHPE 3150"), an oxetane-based resin (manufactured by Toagosei Co., Ltd., product name: "ARON OXETANE OXT-221"), an epoxy group-terminated coupling agent (manufactured by Shin-Etsu Chemical Co., Ltd., product name: "KBM-403"), and a polymerization initiator (CPI-101A manufactured by San-Apro Ltd.) were mixed at a ratio of 60:10:20:4:2 to prepare a UV-curable adhesive.

Example 1

A glass film with ear portions (thickness of each of the ear portions: 1 mm, thickness of an effective region: 100 μm, width: 1,500 mm) was formed by an overflow downdraw method.

A polyethylene terephthalate base material (width: 25 mm) was laminated near each of both ends in the widthwise direction of one surface of the glass film with ear portions via the adhesive prepared in Production Example 1. After that, the adhesive was irradiated with UV light. Thus, a glass film with ear portions including linear resin tapes near both ends in its widthwise direction was obtained.

Next, $CO_2$ laser light having a wavelength of 10.6 μm was applied to continuously remove the ear portions.

A glass film-resin composite was formed as described above, and the glass film-resin composite was wound while a slip sheet was supplied.

The above-mentioned step was performed in one line. That is, the above-mentioned processing was performed without the winding of a body to be conveyed until the glass film-resin composite was wound.

The glass film-resin composite having a length of 1 km was able to be wound 10 times as described above without the breakage of the glass film.

Comparative Example 1

An attempt was made to produce a glass roll by the same method as that of Example described above except that no resin tape was used. As a result, a glass roll having a length of 1 km could not be produced owing to the occurrence of the breakage of the glass film during the production.

Comparative Example 2

A pressure-sensitive adhesive was prepared on the basis of the following production example instead of the adhesive prepared in Production Example 1. The pressure-sensitive adhesive was applied to a silicone-treated polyethylene terephthalate film, and was heated at 155° C. for 1 minute to form a pressure-sensitive adhesive layer having a thickness after drying of 20 μm. Next, the pressure-sensitive adhesive layer was transferred onto the same polyethylene terephthalate base material as that of Example 1 to provide a polyethylene terephthalate film having laminated thereon the pressure-sensitive adhesive layer. An attempt was made to produce a glass roll in the same manner as in Example 1 through use of the resultant film. As a result, a glass roll having a length of 1 km could not be produced because a crack from an end portion of the glass film could not be blocked.

Production Example 2

Preparation of Pressure-Sensitive Adhesive (Preparation of Acrylic Polymer)
100 Parts by weight of butyl acrylate, 5 parts by weight of acrylic acid, and 0.075 part by weight of 2-hydroxyethyl acrylate, 0.2 part by weight of 2,2'-azobisisobutyronitrile serving as a polymerization initiator, and 200 parts by weight of ethyl acetate serving as a polymerization solvent were loaded into a four-necked flask including a stirring blade, a temperature gauge, a nitrogen gas-introducing tube, and a condenser. After air in the flask had been sufficiently purged with nitrogen, the mixed liquid, whose temperature in the flask was kept at around 55° C., was subjected to a polymerization reaction for 10 hours while being stirred in a stream of nitrogen. Thus, an acrylic polymer solution was prepared. The acrylic polymer had a weight-average molecular weight of 2,200,000.

(Preparation of Pressure-Sensitive Adhesive Composition)
100 Parts by weight of the solid content of the acrylic polymer solution was uniformly mixed with 0.2 part by weight of dibenzoyl peroxide (NYPER BMT, manufactured by Nippon Oil & Fats Co., Ltd.) serving as a peroxide, 0.05 part by weight of diglycidylaminomethylcyclohexane (manufactured by Mitsubishi Gas Chemical Company, Inc., TETRAD-C) serving as an epoxy-based cross-linking agent, 0.1 part by weight of a trimethylolpropane-tolylene diisocyanate adduct (manufactured by Nippon Polyurethane Industry Co., Ltd., CORONATE L) serving as an isocyanate-based cross-linking agent, and 0.075 part by weight of a silane coupling agent (manufactured by Shin-Etsu Chemical Co., Ltd., KBM-403), followed by stirring. Thus, an acrylic pressure-sensitive adhesive (solid content: 10.9 wt %) was prepared.

Example 2

In each of both ends in a widthwise direction on a glass film (manufactured by Nippon Electric Glass Co., Ltd., product name: "OA10", size: 100 mm long by 60 mm wide, thickness: 100 µm), a resin tape (width: 3 mm, length: 100 mm) was arranged at a position distant from an end portion by 20 mm. Thus, an evaluation sample was obtained.

The resin tape was arranged by: laminating a polyethylene terephthalate base material (width: 3 mm, thickness: 100 µm) on the glass film via the adhesive prepared in Production Example 1; and then irradiating the adhesive with UV light (wavelength: 365 nm, intensity: 1,000 mJ/cm$^2$ or more) to form an adhesive layer having a thickness of 5 µm.

Examples 3 to 7

Evaluation samples were each obtained in the same manner as in Example 2 except that the width of the polyethylene terephthalate base material was set to a width shown in Table 1. The width of the resin tape was set to be identical to the width of the polyethylene terephthalate base material.

Example 8

An evaluation sample was obtained in the same manner as in Example 2 except that: a cycloolefin base material (width: 5 mm, thickness: 100 µm) was used instead of the polyethylene terephthalate base material (width: 3 mm, thickness: 100 µm); and a resin tape (width: 5 mm, length: 100 mm) was arranged.

Examples 9 to 12

Evaluation samples were each obtained in the same manner as in Example 8 except that the width of the cycloolefin base material was set to a width shown in Table 1. The width of the resin tape was set to be identical to the width of the cycloolefin base material.

Example 13

An evaluation sample was obtained in the same manner as in Example 2 except that: the thickness of the glass film was set to 50 µm; and a polyethylene terephthalate base material (width: 10 mm, thickness: 25 µm) was used instead of the polyethylene terephthalate base material (width: 3 mm, thickness: 100 µm). The width of the resin tape was set to be identical to the width of the polyethylene terephthalate base material.

Examples 14 to 16

Evaluation samples were each obtained in the same manner as in Example 13 except that the width of the polyethylene terephthalate base material was set to a width shown in Table 1. The width of the resin tape was set to be identical to the width of the polyethylene terephthalate base material.

Example 17

An evaluation sample was obtained in the same manner as in Example 2 except that: a polypropylene base material (width: 20 mm, thickness: 100 µm) was used instead of the polyethylene terephthalate base material (width: 3 mm, thickness: 100 µm); and a resin tape (width: 20 mm, length: 100 mm) was arranged.

Examples 18 and 19

Evaluation samples were each obtained in the same manner as in Example 17 except that the width of the polypropylene base material was set to a width shown in Table 1. The width of the resin tape was set to be identical to the width of the polypropylene base material.

Example 20

An evaluation sample obtained in the same manner as in Example 2 except that a polyethylene terephthalate base material (width: 10 mm, thickness: 25 µm) was used instead of the polyethylene terephthalate base material (width: 3 mm, thickness: 100 µm). The width of the resin tape was set to be identical the width of the polyethylene terephthalate base material.

Examples 21 to 23

Evaluation samples were each obtained in the same manner as in Example 20 except that the width of the polyethylene terephthalate base material was set to a width shown in Table 1. The width of the resin tape was set to be identical to the width of the polyethylene terephthalate base material.

<Evaluation>

The evaluation samples obtained in Examples 2 to 23 were subjected the following evaluations. The results are shown in Table 1.

(Calculation of Reinforcement Coefficient)

The Young's modulus Eg of a glass film at 25° C. was identified by a resonance method. The Young's modulus Es of a base material was measured with an autograph (manufactured by Shimadzu Corporation, product name: "AG-1") under the following conditions.

A reinforcement coefficient α was determined from the equation (1).

<Method of Measuring Young's Modulus of Base Material>

Measurement temperature: 25° C.

Sample size: A width of 2 cm and a length of 15 cm

Chuck-to-chuck distance: 10 cm

Tensile rate: 10 mm/min (Evaluation of Reinforcing Effect)

Each of the produced evaluation samples was evaluated for a glass film-reinforcing effect by its resin tapes as described below.

Both short sides of the evaluation sample were fixed with the resin tapes by winding the sample around a roil having an outer diameter of 3 inches along the curved surface of the roll so that the resin tapes each served as an outer surface. Under this state, a fine crack was formed at the center of a long side of the glass film. Thus, the crack progresses toward the resin tapes. At this time, a case in which the progress of the crack was blocked by the resin tapes was judged as passable (indicated by Symbol "o" in the table).

TABLE 1

| | Reinforcement coefficient α | Width of resin tape (mm) | Young's modulus Es of base material (GPa) | Thickness Ts of base material (μm) | Young's modulus Eg of glass film (GPa) | Thickness Tg of glass film (μm) | Reinforcing effect |
|---|---|---|---|---|---|---|---|
| Example 2 | 1.75 | 3 | 4.2 | 100 | 72 | 100 | ○ |
| Example 3 | 2.92 | 5 | 4.2 | 100 | 72 | 100 | ○ |
| Example 4 | 5.83 | 10 | 4.2 | 100 | 72 | 100 | ○ |
| Example 5 | 11.67 | 20 | 4.2 | 100 | 72 | 100 | ○ |
| Example 6 | 14.58 | 25 | 4.2 | 100 | 72 | 100 | ○ |
| Example 7 | 29.17 | 50 | 4.2 | 100 | 72 | 100 | ○ |
| Example 8 | 1.53 | 5 | 2.2 | 100 | 72 | 100 | ○ |
| Example 9 | 3.06 | 10 | 2.2 | 100 | 72 | 100 | ○ |
| Example 10 | 6.11 | 20 | 2.2 | 100 | 72 | 100 | ○ |
| Example 11 | 7.67 | 25 | 2.2 | 100 | 72 | 100 | ○ |
| Example 12 | 15.28 | 50 | 2.2 | 100 | 72 | 100 | ○ |
| Example 13 | 2.06 | 10 | 4.2 | 25 | 72 | 50 | ○ |
| Example 14 | 4.12 | 20 | 4.2 | 25 | 72 | 50 | ○ |
| Example 15 | 5.16 | 25 | 4.2 | 25 | 72 | 50 | ○ |
| Example 16 | 10.31 | 50 | 4.2 | 25 | 72 | 50 | ○ |
| Example 17 | 1.39 | 20 | 0.5 | 100 | 72 | 100 | ○ |
| Example 18 | 1.74 | 25 | 0.5 | 100 | 72 | 100 | ○ |
| Example 19 | 3.47 | 50 | 0.5 | 100 | 72 | 100 | ○ |
| Example 20 | 1.46 | 10 | 4.2 | 25 | 72 | 100 | ○ |
| Example 21 | 2.92 | 20 | 4.2 | 25 | 72 | 100 | ○ |
| Example 22 | 3.65 | 25 | 4.2 | 25 | 72 | 100 | ○ |
| Example 23 | 7.29 | 50 | 4.2 | 25 | 72 | 100 | ○ |

REFERENCE SIGNS LIST

10 elongated glass film
20 resin tape
21 adhesive layer
22 base material
100 glass film-resin composite

The invention claimed is:

1. A glass film-resin composite, comprising:
an elongated glass film; and
a resin tape arranged on at least one surface of the elongated glass film,
wherein the resin tape is linearly arranged at least near each of both ends in a widthwise direction of the elongated glass film in one surface of the elongated glass film,
wherein the resin tape includes an adhesive layer, and the adhesive layer is directly arranged on the elongated glass film,
wherein the adhesive layer is formed of an adhesive that exhibits its peel-resisting force by being solidified, and the adhesive layer has a Young's modulus of 1 GPa or more,
wherein the resin tape includes a base material and the adhesive layer arranged on one side of the base material,
wherein a width Lt (mm) of the resin tape, a Young's modulus Eg (GPa) of the elongated glass film, a Young's modulus Es (GPa) of the base material, a thickness Tg (μm) of the elongated glass film, and a thickness Ts (μm) of the base material have a relationship represented by the following equation (1), and wherein α in the following equation (1) represents 1.1 or more $$Lt = \alpha \frac{Eq\sqrt{Tg}}{EsTs}. \quad (1)$$

2. The glass film-resin composite according to claim 1, wherein the four or more resin tapes are arranged per one surface of the elongated glass film.

3. The glass film-resin composite according to claim 1, wherein the resin tape is arranged on each of both surfaces of the elongated glass film.

4. The glass film-resin composite according to claim 3, wherein the resin tape arranged on a front surface of the elongated glass film and the resin tape arranged on a rear surface of the elongated glass film are arranged so as to be free from being opposite to each other.

5. The glass film-resin composite according to claim 1, further comprising a slip sheet arranged on one surface of the elongated glass film.

6. The glass film-resin composite according to claim 1, wherein the glass film-resin composite has a roll shape.

* * * * *